United States Patent [19]
Chapin

[11] 3,823,481
[45] July 16, 1974

[54] FRAMING LAYOUT JIG
[75] Inventor: Everett E. Chapin, Latrobe, Calif.
[73] Assignee: Josephine A. Chapin, Latrobe, Calif.; a part interest
[22] Filed: Sept. 25, 1972
[21] Appl. No.: 291,632

[52] U.S. Cl. .................................... 33/96, 33/138
[51] Int. Cl. .............................................. B43l 7/00
[58] Field of Search ......... 33/90, 91, 93, 103, 75 R, 33/138, 96

[56] References Cited
UNITED STATES PATENTS
| | | | |
|---|---|---|---|
| 74,297 | 2/1868 | Barnett | 33/90 |
| 2,563,674 | 8/1951 | Coots | 33/75 R |
| 3,169,320 | 2/1965 | Currie | 33/96 |
| 3,181,242 | 5/1965 | Cook | 33/75 R |
| 3,390,461 | 7/1968 | Anderson | 33/75 |

Primary Examiner—Louis R. Prince
Assistant Examiner—Charles E. Phillips
Attorney, Agent, or Firm—Clarence A. O'Brien; Harvey B. Jacobson

[57] ABSTRACT

A framing layout jig having a frame provided with measuring indicia and marking surfaces, and a bracket for cooperatively connecting a conventionally marked tape measure to the frame for measuring distances for a framing layout. The frame has a pair of similar leg portions arranged at a right angle with respect to one another so as to fit along the edge of framing plates and the like. The bracket is pivotally mounted on one of these leg portions, and has a portion which retainingly embraces a substantial portion of a periphery of the housing of the tape measure.

6 Claims, 5 Drawing Figures

FRAMING LAYOUT JIG

BACKGROUND OF THE INVENTION

1. Field of the Invention

This invention relates generally to a framing layout jig, and in particular to a layout jig permitting accurate locating of studs, joists, rafters, and the like without the use of a carpenter's square and the like.

2. Description of the Prior Art

In the conventional procedure of laying out framing for buildings such as frame houses and the like, the carpenter measures with a, for example, tape measure from an end of a plate and the like to the center of the, for example, first stud and the like, subtracts half the width of the stud and the like, and scribes a mark on the plate and the like. Next, spaces on, for example, 16 inch centers are measured from the marks and lines are made on the plates and the like with the aid of a carpenter's square and the like to indicate the location of an edge of the studs and the like. An indicia such as "X" is used to designate the side of the line to which the stud and the like is to be arranged. However, with this known system errors are frequently made, such as the square being improperly positoned for marking the line, or the stud and the like being placed on the wrong side of the line.

A system has been proposed using a templet in the form of a tape provided with markings for a standard center framing such as one having 16 inch centers. This approach has the disadvantage of requiring large quantities of tape for a single frame, and different tapes for different centers and purposes. Accordingly, it is not much used by those skilled in the art.

SUMMARY OF THE INVENTION

It is an object of the present invention to provide a framing layout jig that may be used with a conventional tape measure and the like to lay out framing without the need of any other tools, such as a carpenter's square.

It is another object of the present invention to provide a framing layout jig which will permit layouts to be made rapidly and simply, but with a minimum risk of error.

These and other objects are achieved according to the present invention by providing a framing layout jig having a frame furnished with measuring indicia and marking surfaces, and an arrangement for cooperatively connecting a measuring device to the frame. This measuring device cooperates with the measuring indicia to locate centers of studs and the like.

The connecting arrangement advantageously is provided with a bracket having a portion thereof arranged for retainingly embracing a substantial portion of a periphery of a housing of the measuring device. The measuring device housing is selectively arrangeable in the bracket, which is pivotally mounted to the frame. This pivotal mounting permits measurements to be taken from either end of framing plates and the like when the frame has a pair of leg portions arranged at right angles to one another to fit over an edge of the plates and the like.

The measuring device is preferably a conventionally marked tape measure having in the usual manner a housing and a tape arranged for extension from and retraction into the housing.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a fragmentary, top plan view showing a framing layout jig according to the present invention and a tape measure arranged on framing plates and the like.

DESCRIPTION OF THE PREFERRED EMBODIMENTS

Figure 1:
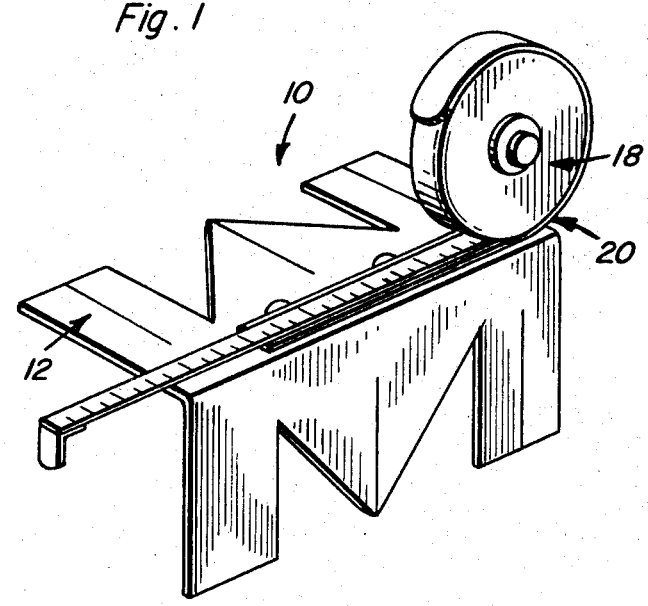
FIG. 1 is a perspective view showing a framing layout jig according to the present invention with a tape measure connected thereto.
Figure 2:
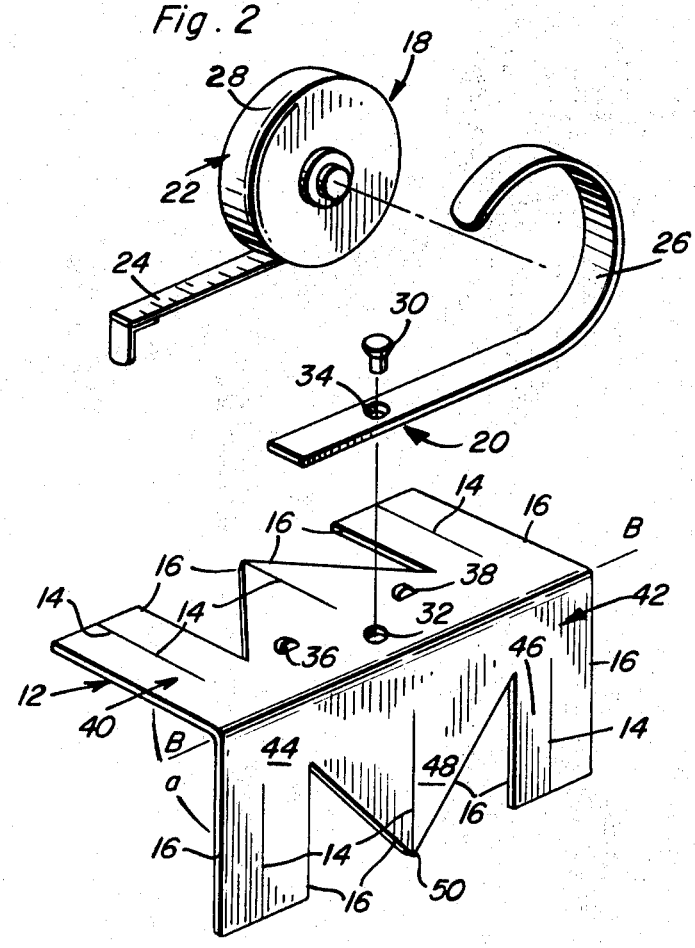
FIG. 2 is an exploded, perspective view showing the structure of FIG. 1.

FIGS. 1 and 2 of the drawings show a framing layout jig 10 according to the present invention. This jig 10 has a frame 12 provided with measuring indicia, in the form of grooves 14, and marking surfaces 16. A conventionally marked tape measure 18 is cooperatively connected to frame 12 as by an arrangement 20 which will be discussed in detail below.

Since tape measure 18 may be any standard type having a housing 22 and a, for example, steel tape 24 arranged for extension from and retraction into housing 20 currently being manufactured, it will not be described in detail herein.

Figure 3:
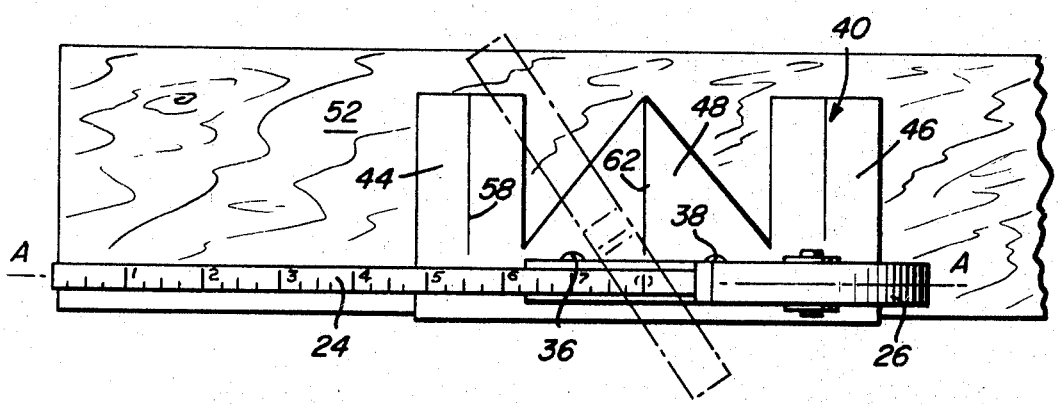
Figure 4:
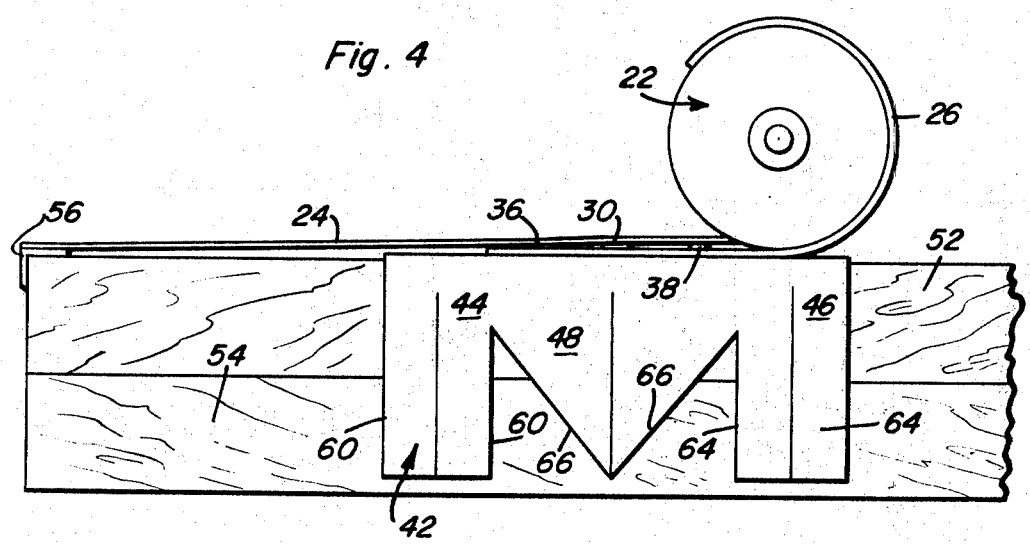
FIG. 4 is a fragmentary, side elevational view showing the arrangement of FIG. 3.
Figure 5:
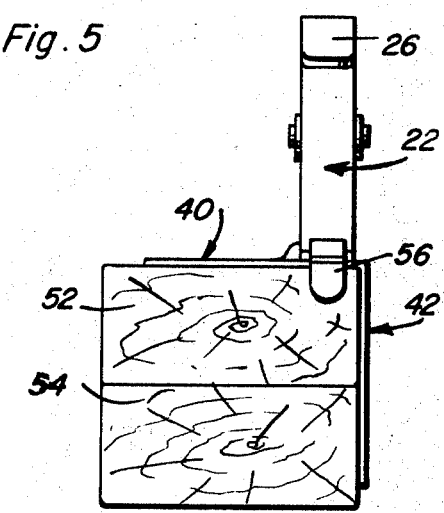
FIG. 5 is an end elevational view showing the arrangement of FIGS. 3 and 4.

Arrangement 20 includes a bracket 26 having a portion thereof arranged for retainingly embracing a substantial portion, more than half as illustrated, of a periphery 28 of housing 22. In this manner, housing 22 is selectively arrangeable in bracket 26, which may be constructed from a, for example, spring steel so as to grippingly embrace periphery 28. It is to be understood that housing 22 and the embracing portion of bracket 26 may assume other configurations than that illustrated. A pin 30, which may be a standard rivet and the like, pivotally mounts bracket 26 to frame 12 by being arranged in holes 32 and 34 provided in frame 12 and bracket 26, respectively. The lower end of pin 30 may be retained in holes 32 and 34 by being, for example, crimped (not shown) in a known manner. Projecting members 36 and 38 are advantageously provided on frame 12, and are arranged for selectively engaging and positioning bracket 26 along a line A—A (FIG. 3). Bracket 26 is arrangeable in one of two opposed directions, only one of which is shown in FIGS. 3 to 5. Pin 30 is dimensioned for permitting selective movement of bracket 26 in a direction parallel to an axial extent of pin 30 for clearing members 36, 38 and permitting rotation (broken lines in FIG. 3) of bracket 26 about the axial extent of pin 30. This axial dimensioning may be seen in FIG. 4.

Frame 12 has two planar leg portions 40 and 42 joined together along a straight line B—B, and arranged extending from one another at an angle $a$. Desirably, angle $a$ is substantially a right or 90° angle. Frame 12 may be constructed by, for example, bending a sheet of, for example, metal in a known manner. Hole 32 and members 36, 38 are arranged in one leg portion 40, 42; portion 40 being illustrated as provided with these elements. Further, hole 32 and members 36, 38 are arranged so that tape 24 will lie adjacent and parallel to line B—B.

Each leg portion 40, 42 has end regions 44, 46 formed as rectangles and spaced along line B—B, and an isosceles-triangle shaped region 48 arranged between regions 44, 46. Substantially straight, parallel grooves 14 are symmetrically arranged in each region 44, 46 of the leg portions 40, 42, and one groove 14 is arranged bisecting an apex 50 of triangle shaped region 48. These grooves 14 are also arranged substantially perpendicular to line B—B. Grooves 14 correspond to the center of standard studs, ceiling joists, rafters, and the like, and cooperate with surfaces 16 and tape measure 18 in a manner to be set out below.

Referring now to FIGS. 3 to 5 of the drawings, most standard studding marks, partition marks, and the like are scribed on a pair of plates formed by boards 52 and 54 laid together. These plates are separated after the marks have been made, and one board is used as a, for example, sill plate and the other as a, for example, top plate. Studding and the like is then, for example, nailed in a known manner to these plates, and the resulting frame portion is tilted up into proper position with respect to the total frame.

To start a, for example, layout of studs, the hooked end 56 of tape 24 is hooked to the left end of the plates as viewed in FIGS. 3 to 5 of the drawings. It is to be understood that the layout could be made from right to left as well as left to right by lifting bracket 26 above members 36, 38 and pivoting same 180° from the position shown in FIGS. 3 to 5. Alternatively, frame 12 could be arranged on the opposite end and edge of the boards 24, 54 than the edge illustrated in the drawings. Frame 12 is now moved along the plates until the desired dimension on tape 24 — which may be, for example, 50, 75, or 100 foot tape — for centering the first stud is aligned with the left-hand groove 14, designated as 58 in FIG. 3 of the drawings. Now marks can be scribed on both surfaces 16, designated 60 in FIG. 4, of the associated end region 44. The first stud goes between these two marks. The remaining studs are located by successively moving frame 12 further to the right until a dimension on tape 24 which is the on-center dimension difference between the previous dimension, is aligned with groove 58, and the appropriate marks are made. The marks may be pencil lines instead of scribed markings.

For laying out ceiling joists and rafters, again align groove 58 with the desired dimension indicia on tape 24, and scribe marks along surfaces 60. The joist or rafter fits between the two marks.

When laying out partitions, align the desired dimension indicia on tape 24 with groove 62 (FIG. 3). Then scribe marks on surfaces 60 and 64 (FIG. 4) of regions 44 and 46, and a surface 66 (FIG. 4) either on both leg portions 40, 42 or only portion 42.

When laying out from right to left as seen in FIGS. 3 and 4, end region 46 would be used instead of end region 44.

The use of a jig 10 according to the present invention may be easily mastered without special training, and makes possible rapid and accurate framing layout.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A framing layout jig, comprising, in combination:

a. a frame provided with measuring indicia and marking surfaces, the frame having two planar leg portions joined together along a straight line and arranged extending from one another at substantially a right angle, each leg portion having end regions formed as rectangles and spaced along the straight line, and having an isosceles-triangle shaped region arranged between the end regions, and substantially straight, parallel grooves provided in the leg portions, a groove arranged in each end region and one bisecting an apex of the triangular-shaped region, said grooves arranged substantially perpendicular to the straight line; and
    b. means for cooperatively connecting to the frame a device for measuring distances for a framing layout.

2. A structure as defined in claim 1, further including the measuring device, said measuring device being a conventionally marked tape measure having a housing and a tap arranged for extension from and retraction into the housing.

3. A structure as defined in claim 1, wherein the connecting means includes a bracket having a portion thereof arranged for retainingly embracing a substantial portion of a periphery of a housing of a measuring device.

4. A structure as defined in claim 3, wherein the connecting means further includes a pin and a hole provided in one of the leg portions of the frame and mating hole in the bracket, said pin being arranged in the holes for pivotally mounting the bracket to the frame.

5. A structure as defined in claim 4, wherein projecting members are provided on the one of the leg portions of the frame provided with the hole, and are arranged for selectively engaging and positioning the bracket along a line, with the bracket arrangeable in one of two opposed directions, said pin being arranged for permitting selective movement of the bracket in a direction parallel to an axial extent of the pin for clearing the projecting members and being rotated about the axial extent of the pin.

6. A framing layout jig, comprising, in combination:

a. a frame provided with measuring indicia and marking surfaces, the frame having two planar leg portions joined together along a straight line and arranged extending from one another at substantially a right angle, at least one leg portion having end regions formed as rectangles and spaced along the straight line, and having an isosceles-triangle shaped region arranged between the end regions, and substantially straight, parallel marks provided in the one leg portion, a mark arranged in each end region and one bisecting an apex of the triangular-shaped region, said marks arranged substantially perpendicular to the straight line; and
    b. means for cooperatively connecting to the frame a device for measuring distances for a framing layout.

* * * * *